United States Patent
Ackeret et al.

(10) Patent No.: US 10,471,899 B2
(45) Date of Patent: Nov. 12, 2019

(54) DEVICE FOR SUSPENDING OBJECTS FROM A MOTOR VEHICLE SEAT

(71) Applicant: Kinetix AG, Glarus (CH)

(72) Inventors: Peter Ackeret, Zürich (CH); Michael Andreas Keller, Freudenstadt (DE)

(73) Assignee: KINETIX AG, Glarus (CH)

( * ) Notice: Subject to any disclaimer, the term of this patent is extended or adjusted under 35 U.S.C. 154(b) by 56 days.

(21) Appl. No.: 15/571,180

(22) PCT Filed: Mar. 15, 2016

(86) PCT No.: PCT/EP2016/055595
§ 371 (c)(1),
(2) Date: Nov. 1, 2017

(87) PCT Pub. No.: WO2016/177501
PCT Pub. Date: Nov. 10, 2016

(65) Prior Publication Data
US 2018/0361940 A1    Dec. 20, 2018

(30) Foreign Application Priority Data

May 1, 2015 (CH) ...................... 0602/15

(51) Int. Cl.
*B60R 7/00* (2006.01)
*B60R 7/04* (2006.01)
(Continued)

(52) U.S. Cl.
CPC ............. *B60R 7/043* (2013.01); *B60R 7/08* (2013.01); *B60R 7/10* (2013.01); *B60N 2/879* (2018.02); *B60N 2002/905* (2018.02)

(58) Field of Classification Search
CPC .. B60R 7/043; B60R 7/08; B60R 7/10; B60N 2/879; B60N 2002/905
(Continued)

(56) References Cited

U.S. PATENT DOCUMENTS 6,315,180 B1 * 11/2001 Watkins .................. B60R 11/04
224/275
2003/0121943 A1 * 7/2003 Chou ..................... B60R 7/043
224/275
(Continued)

FOREIGN PATENT DOCUMENTS

DE    19909879 A1    9/1999
JP    2014094638 A    5/2014
(Continued)

OTHER PUBLICATIONS

International Search Report and Written Opinion Form PCT/ISA/210 and PCT/ISA/237, International Application No. PCT/EP2016/055595, pp. 1-7, International Filing Date Mar. 15, 2016, dated Jul. 18, 2017.

*Primary Examiner* — Peter N Helvey
(74) *Attorney, Agent, or Firm* — Leydig, Voit & Mayer, Ltd.

(57) ABSTRACT

The invention relates to a device for suspending objects from a part of a motor vehicle seat, such as a backrest, a headrest, or a headrest mounting of a vehicle seat, comprising a fastening element and a receiving socket for connecting the device to the motor vehicle seat part, and comprising a plug-in element that can be coupled to the receiving socket. At one end, a support arm for suspending the objects is connected to the rear end of the plug-in element by way of a rotary joint having an axis of rotation extending substantially parallel to the broad side of the backrest and/or the headrest, and horizontal, and at the other end, the support arm has an L-shaped hook. In the in-use position, the support arm is oriented such that the longitudinal axis thereof is oriented approximately vertically downwards, and such that the longitudinal axis of the plug-in element includes an angle (α) between approximately 60° and 120°.

13 Claims, 3 Drawing Sheets

(51) Int. Cl.
*B60R 7/10* (2006.01)
*B60R 7/08* (2006.01)
B60N 2/879 (2018.01)
B60N 2/90 (2018.01)

(58) Field of Classification Search
USPC .......................................................... 224/275
See application file for complete search history.

(56) References Cited

U.S. PATENT DOCUMENTS

| | | | |
|---|---|---|---|
| 2003/0150892 A1* | 8/2003 | Hoe | B60R 5/006 |
| | | | 224/275 |
| 2011/0233245 A1* | 9/2011 | Singh | B60N 3/004 |
| | | | 224/275 |
| 2012/0018471 A1* | 1/2012 | Guillermo | B60R 11/0235 |
| | | | 224/275 |
| 2013/0037672 A1* | 2/2013 | Sanchez | B60R 7/10 |
| | | | 248/303 |
| 2013/0068809 A1* | 3/2013 | Wang | B60R 11/02 |
| | | | 224/275 |
| 2014/0021230 A1* | 1/2014 | Sanchez | B60R 7/10 |
| | | | 224/275 |
| 2015/0041508 A1* | 2/2015 | Fan | B60R 11/02 |
| | | | 224/275 |
| 2016/0059793 A1* | 3/2016 | Mitchell | B60R 11/0235 |
| | | | 224/275 |
| 2016/0167593 A1* | 6/2016 | Dry | B60R 11/02 |
| | | | 297/188.04 |

FOREIGN PATENT DOCUMENTS

| | | |
|---|---|---|
| WO | 2009112280 A2 | 9/2009 |
| WO | 2010139452 A1 | 12/2010 |

* cited by examiner

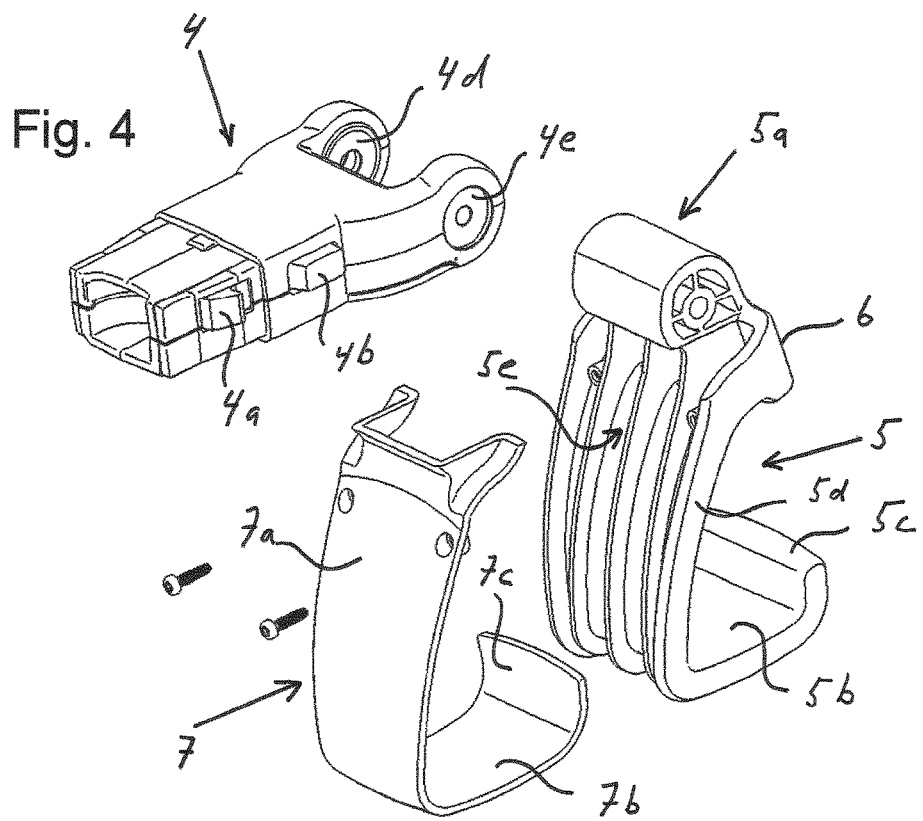
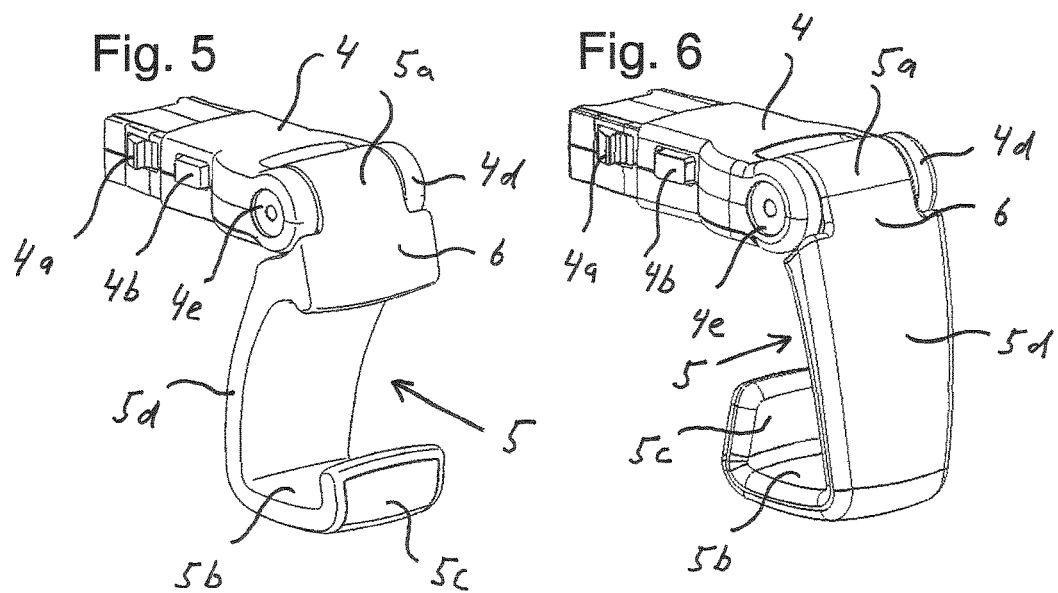

DEVICE FOR SUSPENDING OBJECTS FROM A MOTOR VEHICLE SEAT

CROSS-REFERENCE TO RELATED APPLICATIONS

This application is the United States National Stage application under 35 U.S.C. 371 of PCT/EP2016/055595, filed Mar. 15, 2016, which claims priority to Switzerland Application Serial Number 00602/15, filed May 1, 2015, the entire disclosure of each of which is incorporated herein by reference.

BACKGROUND OF THE INVENTION

The invention relates to a device for suspending objects from a part of a motor vehicle seat, such as a backrest, a headrest or a headrest mounting of a vehicle seat.

A device of this type is disclosed in DE 10 2010 022 392 A1 from the applicant, to which reference is made. The device disclosed therein comprises a fastening element having a receiving socket for attaching the device to the vehicle seat part, a plug-in element that can be coupled to the receiving socket by means of a locking mechanism for releasably locking the plug-in element in the receiving socket, and a support arm arranged on the plug-in element for suspending the objects.

The support arm is hook-shaped and comprises a bottom wall and an end wall that extends approximately vertically and is arranged on the front end of the bottom wall, on the upper end of which end wall a holding-down means is arranged which is oriented towards the plug-in element and extends approximately in parallel with the bottom wall.

The support arm is connected to the plug-in element by way of a rotary joint which is arranged on the rear end of the bottom wall and has an axis of rotation which extends horizontally and substantially in parallel with the broad side of the backrest and/or headrest, and can be folded out by approximately 180° from a folded-in out-of-use position, in which the holding-down means of the support arm rests against the upper top wall of the plug-in element such that said support arm is oriented towards the plug-in element and is substantially congruent with said upper top wall of said plug-in element (FIGS. 7 and 9), into an in-use position, in which the support arm is oriented approximately horizontally (FIGS. 8 and 10).

In order to fold the support arm in and out, a specific clearance has to be provided. If, for example, the device is fastened to the rods of a headrest mounting, the headrest has to be adjusted to a corresponding height, which may be contrary to the safety requirements.

If the receiving socket has to be installed in the backrest, the plug-in element has to be extended so far that the support arm is outside the backrest in the folded-in out-of-use position, which results in the support arm protruding well beyond the backrest in the in-use position, results in a hindrance or even a hazard to passengers in the backseat, and is also not aesthetically pleasing.

The large lever between the receiving socket and the fastening point of the loads requires that the device be robustly connected to the vehicle seat part, and that the receiving socket, plug-in element, rotary joint and support arm have a very stable and correspondingly costly design.

Furthermore, when the tilt of the backrest is adjusted, the support arm is moved into different inclined positions such that an adjustable end stop would have to be provided on the rotary joint in order to allow for the angle of tilt of the backrest, and this would lead to a substantial increase in production costs.

SUMMARY OF THE INVENTION

The object of the invention is to provide a device for suspending objects from a motor vehicle seat which eliminates these disadvantages.

This object is achieved by a device for suspending objects from a part of a motor vehicle seat.

As a result of the longitudinal axis of the support arm being oriented approximately vertically downwards and forming, together with the longitudinal axis of the plug-in element, an angle $\alpha$ of between approximately 60° and 120° in the in-use position, the extent to which the device according to the invention protrudes beyond the backrest, and thus the hindrance and hazard to passengers in the backseat, is minimal.

Furthermore, the lever arm between the receiving socket and the hook is substantially shorter, and so the loads of the receiving socket, plug-in element, rotary joint and support arm are substantially lower, which provides for a simpler and cheaper construction.

Moreover, when the longitudinal axis of the support arm is oriented vertically, both downward inclined positions of the receiving socket in the backrest between approximately horizontal and 30° in the direction of travel and obliquely backward tilting of the backrest between approximately vertical and 30° can be compensated for by means of the device according to the invention, and the device can therefore be used for a large number of different motor vehicles having different seat settings.

Furthermore, when the hook is loaded, the support arm is automatically oriented in an approximately vertical position, independently of the inclination of the receiving socket in the backrest and the tilt of the backrest.

In a preferred embodiment, by using a spring it could be ensured that the support arm is biased towards the backrest.

Preferably, a friction brake is provided on the rotary joint such that a certain force has to be applied in order to turn the support arm.

In a preferred embodiment, the hook on the support arm is oriented towards the backrest.

In another preferred embodiment, the hook on the support arm is oriented away from the backrest.

In a preferred development, the rear end of the plug-in element is fork-shaped and the rotary joint which is arranged on the upper end of the support arm is mounted in bearing sleeves between the two fork ends.

In another preferred embodiment, the fork ends of the plug-in element and the upper end of the support arm are designed to be complementary to the rotary joint and to have aligned outer contours, and together form a protective shield for preventing injury to passengers.

In another preferred embodiment, the outer contour of the support arm is convexly curved.

In a preferred development, the support arm is covered on the outer sides by a separate covering panel, hollow spaces being formed between the support arm and the covering panel.

In another preferred embodiment, the length of the plug-in element is such that the rotary joint is behind the backrest.

Additional advantages and embodiments of the invention are found in the description and the accompanying drawings.

It goes without saying that the aforementioned features and the features to be described below may be used not only in the combinations specified in each case, but also in other combinations or individually, without departing from the scope of the present invention.

BRIEF DESCRIPTION OF THE DRAWINGS

The invention is described in more detail below on the basis of preferred embodiments and with reference to the corresponding drawings.

FIG. 4 is an exploded view of a variant of the device having a clamshell-type support arm.

FIG. 5 is a perspective view of the device according to the view in FIG. 3.

FIG. 6 is a perspective view of another variant of the device having a hook which is oriented towards the backrest.

DETAILED DESCRIPTION

Figure 1:
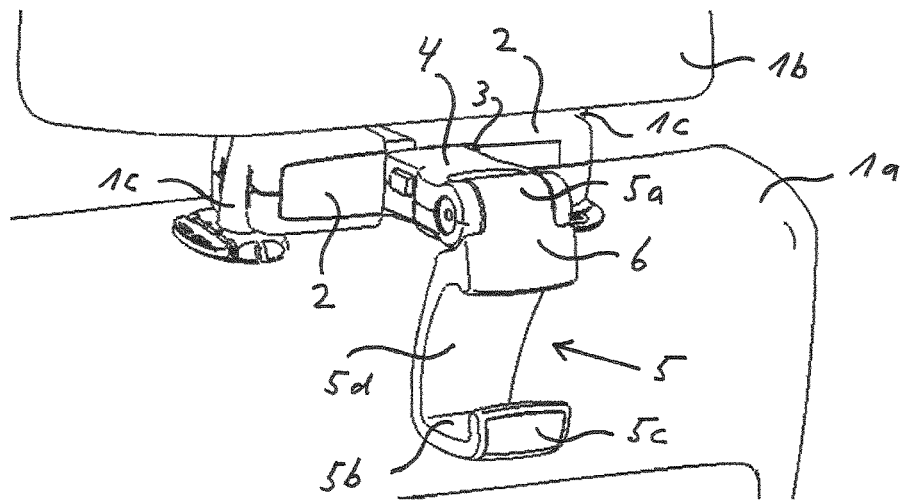
FIG. 1 is a perspective view of the device which is attached to the headrest mounting of a motor vehicle seat by means of a fastening element and has a hook which is oriented away from the backrest.
Figure 2:
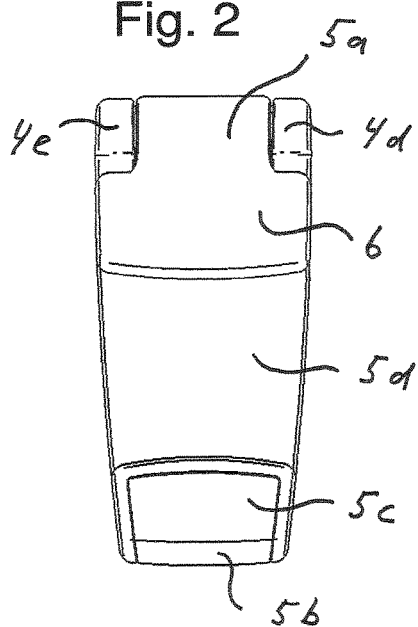
FIG. 2 is a view from behind of the device according to the view in FIG. 1.
Figure 3:
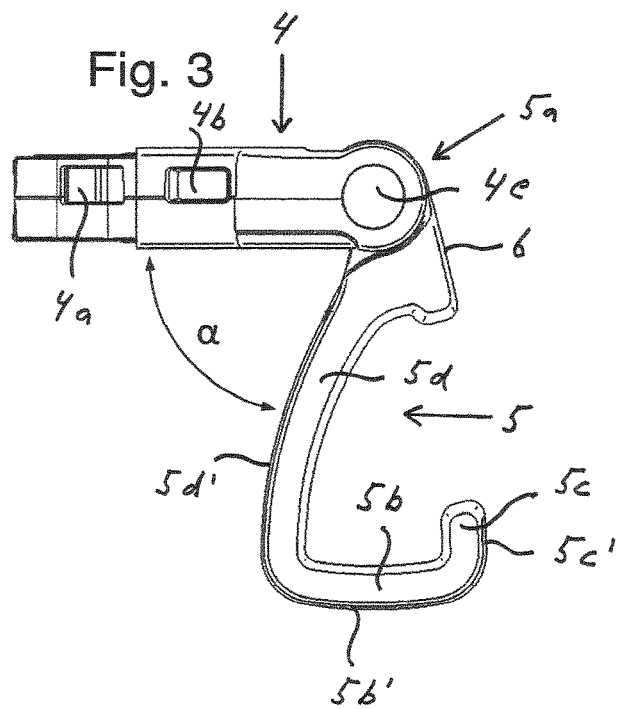
FIG. 3 is a side view of the device according to the view in FIG. 2.

FIGS. 1 to 3 show a first embodiment of the device. Between the backrest 1a and the headrest 1b of a motor vehicle seat 1, a fastening element 2 is fastened to the headrest rods 1c (FIG. 1).

In the fastening element 2, a receiving socket 3 is arranged approximately centrally into which a plug-in element 4 is inserted. In the in-use position, the support arm 5 is connected to the rear end of the plug-in element 4 by way of the rotary joint 5a such that the longitudinal axis is vertically oriented.

The rear end of the plug-in element 4 is fork-shaped and is provided with bearing sleeves 4d, 4e in which the rotary joint 5a arranged on the upper end of the support arm 5 is mounted. The rotary joint 5a and the bearing sleeves 4d, 4e form a friction hinge such that the support arm 5 is held in the desired out-of-use position.

The support arm 5 comprises a convexly curved rear wall which is connected to the rotary bearing 5a, on the lower end of which wall an L-shaped hook, consisting of the hook bottom 5b and the support wall 5c, is arranged.

A protective shield 6 is arranged on the upper end of the rear wall 5d which, together with the rotary bearing 5a, forms a homogenous surface for protecting against injury to passengers.

The plug-in element 4 can be coupled to the receiving socket 3 arranged in the fastening element 2 and can be locked in the receiving socket 3 by means of locking hooks 4a located on either side of the plug-in element 4. This locking can be undone by means of the release buttons 4b which are also arranged on either side of the plug-in element 4.

In the in-use position, the longitudinal axis of the support arm 5 is oriented approximately vertically downwards and forms, together with the longitudinal axis of the plug-in element 4, an angle α of between 60° and 120°, the angle α being 90° in FIG. 3.

FIG. 4 shows the construction of a clamshell-type support arm 5. The outer sides of the rear wall 5d, the hook bottom 5b and the support wall 5c are covered by a covering panel 7. The rear wall 5d, the hook bottom 5b and the support wall 5c of the support arm 5 are provided with longitudinal ribs 5e which support the covering panel 7 and form hollow spaces.

FIG. 5 shows a support arm 5 comprising a hook (5b, 5c) which faces away from the backrest 1a, as shown in FIG. 1-FIG. 4, FIG. 7 and FIG. 8.

FIG. 6 shows a support arm 5 comprising a hook (5b, 5c) which is oriented towards the backrest (1a).

Figure 7:
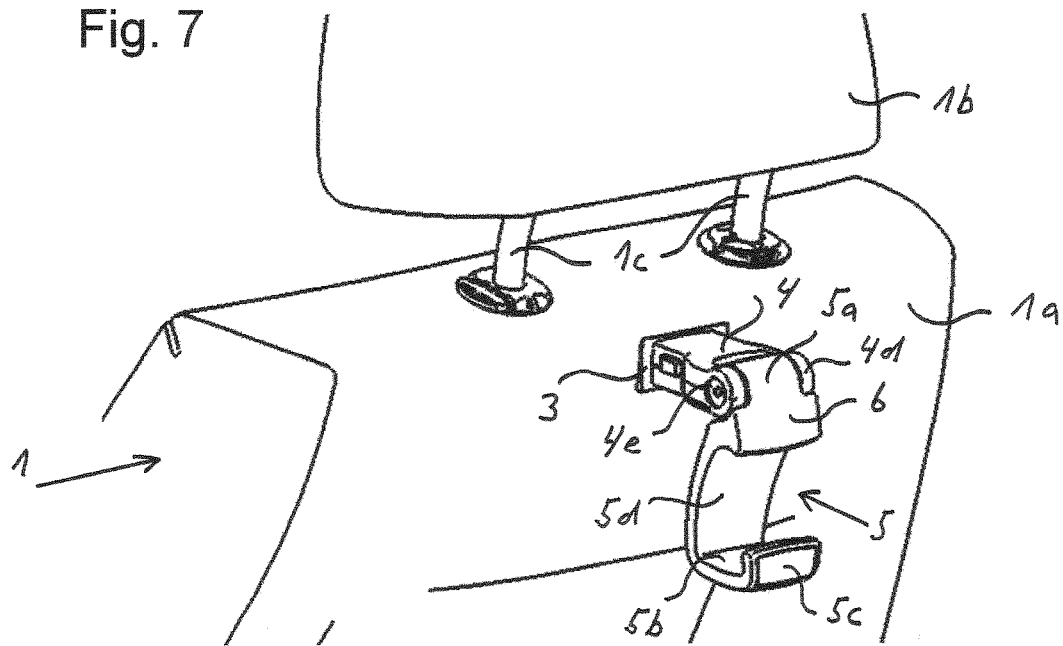
FIG. 7 is a perspective view of a receiving socket integrated in the backrest and having an attached device.

FIG. 7 shows the device attached to a receiving socket 3 which is integrated in a backrest 1a.

Figure 8:
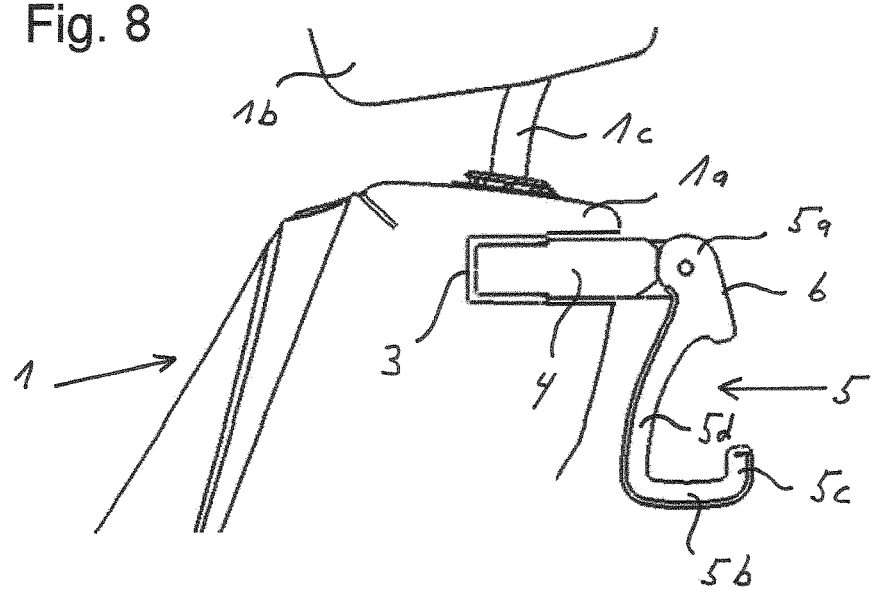
FIG. 8 is a cross-sectional view of the backrest having an integrated receiving socket and an attached device according to the view in FIG. 7.

FIG. 8 shows a cross section through the backrest 1a comprising an attached device according to the view in FIG. 7.

The invention claimed is:

1. A device for suspending objects from a part of a motor vehicle seat, the part of the motor vehicle seat comprising a backrest, a headrest, or a headrest mounting of the vehicle seat, the device comprising:
   a fastening element having a receiving socket for attaching the device to the part of the motor vehicle seat,
   a plug-in element which can be coupled to the receiving socket,
   a support arm for suspending the objects, which is connected at one end to a rear end of the plug-in element by way of a rotary joint having an axis of rotation which extends horizontally and substantially in parallel with a broad side of the backrest or the headrest, and which is provided with an L-shaped hook at the other end, wherein, in a in-use position, a longitudinal axis of the support arm is oriented approximately vertically downwards and forms, together with a longitudinal axis of the plug-in element, an angle α of between approximately 60° and 120°,
   wherein the support arm is covered by a separate covering panel, hollow spaces being formed between the support arm and the covering panel.

2. The device according to claim 1, wherein the support arm comprises a rear wall which is connected to the rotary bearing, and an L-shaped hook which is arranged on the lower end of the rear wall and has a hook bottom and a support wall.

3. The device according to claim 2, wherein the outer side of the rear wall of the support arm is convexly curved.

4. A device for suspending objects from a part of a motor vehicle seat, such as a backrest, a headrest or a headrest mounting of a vehicle seat, comprising:
   a fastening element having a receiving socket for attaching the device to the part of the motor vehicle seat,
   a plug-in element which can be coupled to the receiving socket,
   a support arm for suspending the objects, which is connected at one end to the rear end of the plug-in element by way of a rotary joint having an axis of rotation which extends horizontally and substantially in parallel with the broad side of the backrest and/or headrest, and which is provided with an L-shaped hook at the other end, characterized in that, in the in-use position, the longitudinal axis of the support arm is oriented approximately vertically downwards and forms, together with the longitudinal axis of the plug-in element, an angle α of between approximately 60° and 120° wherein the support arm comprises a rear wall which is connected to the rotary bearing, and an L-shaped hook which is arranged on the lower end of the rear wall and has a hook bottom and a support wall, and wherein the outer sides of the rear wall, the hook bottom and the support wall are covered by a covering panel, and wherein the rear wall, the hook bottom and the support wall of the support arm are provided with longitudinal ribs which support the walls of the panel and form hollow spaces.

5. The device according to claim 1, wherein the rear end of the plug-in element is fork-shaped, and the rotary joint arranged on the upper end of the support arm is mounted in bearing sleeves between the two fork ends.

6. The device according to claim 1, wherein a protective shield which is arranged on the support arm and is intended for covering the rotary joint is provided.

7. The device according to claim 6, wherein the fork-shaped end of the plug-in element and the upper end of the support arm are designed to be complementary to the rotary joint and to have aligned outer contours as a homogenous surface, and form the protective shield.

8. The device according to claim 1, wherein the hook on the support arm is oriented towards the backrest.

9. The device according to claim 1, wherein the hook on the support arm faces away from the backrest.

10. The device according to claim 1, wherein a spring is provided which biases the support arm towards the backrest.

11. The device according to claim 1, wherein a friction brake is provided on the rotary joint.

12. The device according to claim 1, wherein the rotary joint is arranged behind the backrest.

13. The device according to claim 1, wherein a locking mechanism is provided for releasably locking the plug-in element in the receiving socket.

* * * * *